United States Patent
Lin et al.

(10) Patent No.: US 9,367,690 B2
(45) Date of Patent: Jun. 14, 2016

(54) ENCRYPTION AND DECRYPTION METHODS APPLIED ON OPERATING SYSTEM

(71) Applicant: MOXA INC., New Taipei (TW)

(72) Inventors: Shang-Jyh Lin, New Taipei (TW); Cheng-Tao Hsu, New Taipei (TW)

(73) Assignee: MOXA Inc., New Taipei (TW)

(*) Notice: Subject to any disclaimer, the term of this patent is extended or adjusted under 35 U.S.C. 154(b) by 238 days.

(21) Appl. No.: 14/320,668

(22) Filed: Jul. 1, 2014

(65) Prior Publication Data
US 2016/0004866 A1  Jan. 7, 2016

(51) Int. Cl.
*G06F 15/177* (2006.01)
*G06F 21/57* (2013.01)
*H04L 9/06* (2006.01)
*G06F 21/62* (2013.01)
*G06F 9/44* (2006.01)

(52) U.S. Cl.
CPC .......... *G06F 21/575* (2013.01); *G06F 21/6281* (2013.01); *H04L 9/0643* (2013.01); *G06F 9/4401* (2013.01)

(58) Field of Classification Search
CPC .. G06F 21/575; G06F 21/6281; H04L 9/0643
USPC .......................................................... 713/2
See application file for complete search history.

(56) References Cited

U.S. PATENT DOCUMENTS

| | | | | |
|---|---|---|---|---|
| 5,414,771 A * | 5/1995 | Fawcett, Jr. | ........... | H04L 9/0662 380/44 |
| 6,801,588 B1 * | 10/2004 | Yamaguchi | ......... | H03M 7/4006 375/232 |
| 8,347,070 B1 * | 1/2013 | Bacha | ................... | G06F 9/4401 713/2 |
| 8,364,965 B2 * | 1/2013 | Farrugia | .................. | G06F 21/64 713/161 |
| 2001/0042005 A1 * | 11/2001 | McClure | ................ | G07C 13/00 705/12 |
| 2003/0188179 A1 * | 10/2003 | Challener | ............... | G06F 21/57 713/193 |
| 2006/0179483 A1 * | 8/2006 | Rozas | ..................... | G06F 21/57 726/22 |
| 2007/0198851 A1 * | 8/2007 | Goto | ..................... | G06F 12/145 713/187 |
| 2008/0229114 A1 * | 9/2008 | Okabe | ..................... | G06F 21/57 713/189 |
| 2009/0144559 A1 * | 6/2009 | Lee | ....................... | G06F 21/575 713/189 |
| 2010/0131476 A1 * | 5/2010 | Kataoka | ............ | G06F 17/30979 707/693 |
| 2011/0064217 A1 * | 3/2011 | Fry | ......................... | G06F 21/78 380/46 |
| 2011/0084858 A1 * | 4/2011 | Suzuki | ................... | H04N 19/91 341/67 |
| 2011/0286599 A1 * | 11/2011 | Tuyls | .................... | G06F 21/602 380/278 |
| 2012/0331307 A1 * | 12/2012 | Fernandez Gutierrez | ................ | G06F 21/72 713/190 |
| 2013/0132725 A1 * | 5/2013 | Pochon | ............... | H04L 63/0485 713/171 |
| 2013/0198198 A1 * | 8/2013 | Tsuchimoto | ...... | G06F 17/30321 707/741 |
| 2014/0256419 A1 * | 9/2014 | Laputz | ................ | G07F 17/3241 463/29 |
| 2015/0012738 A1 * | 1/2015 | Shah | ..................... | G06F 21/575 713/2 |

\* cited by examiner

*Primary Examiner* — Thomas Lee
*Assistant Examiner* — Volvick Derose
(74) *Attorney, Agent, or Firm* — Chih Feng Yeh; Huntington IP Consulting Co., Ltd.

(57) ABSTRACT

An encryption and decryption methods applied on an operating system kernel are disclosed, where a hash result is obtained from a computation between a booting program and the operating system kernel by using a definition table, the computation result is combined with the operating system kernel for encryption of the operating system kernel, and the operating system kernel may not be decrypted and thus booted whenever the booting program, the operating system kernel or the two combined are falsified or replaced, whereby the technical efficacy which the booting program and the operating system kernel are authenticated bilaterally for safety booting may be achieved.

14 Claims, 5 Drawing Sheets

| code | ... | !@# | ... | Shift | ... | End | ... | DDD | ... | XYZ | ... | 135 | ... |
|---|---|---|---|---|---|---|---|---|---|---|---|---|---|

ENCRYPTION AND DECRYPTION METHODS APPLIED ON OPERATING SYSTEM

BACKGROUND OF RELATED ART

1. Technical Field

The present invention relates to an encryption and decryption methods, and particularly to an operating system kernel encryption and decryption method.

2. Related Art

At present, booting a computer by a booting program and verifying a booting process by an operating system kernel are conducted separately. Namely, a booting process has to be finished by performing the separate verification processes for the booting program and the operating system kernel.

In the verification process for the booting program, an operation-experienced digest is stored into an OTP area, and the digest in the OTP will be selected and computed and compared each time when the computer is booted to verify if the booting program is correct.

On the other hand, in the verification process for the operating system kernel, a signature, a certificate and a root public key have to be pre-stored in a main area. And, a private key owned privately by the operating system kernel is utilized to conduct a digital signature process for one-by-one verification actions.

In the verification processes for the booting program and the operating system kernel, the certificate and signature have both to be compared to verify the correctness and completeness. However, in the cases that the digest, signature, certificate, and toot public key are counterfeited, which are supposed to be easier than resolving the booting program and the operating system kernel, with the verification processes for the booting program and the operating system kernel, the verification processes may be still passed, lending to a risk of being falsified or being replaced with the operating system kernel.

In view of the above, it may be known that there has long an issue of issue where the currently available booting program and operating system kernel have to be separately verified and the verification computation result has to be pre-stored into the OPT area and compared, requiring several times of verification and a huge amount of additional storage space, which are complex in the process, quite time consuming and unsafe. Therefore, there is quite a need to set forth an improvement means to settle down this problem.

SUMMARY

According to a first embodiment of the present invention, an encryption method applied on an operating system kernel, being suitable for use on a device having a booting program and the operating system kernel stored therein, comprising steps of pre-establishing a definition table in the booting program, the definition table having codes stored therein; selecting randomly a plurality of codes from the definition table by the booting program and recording the plurality of codes having been selected by the booting program when the booting program is executed at a first time; looking for at least one booting bit value set each having a plurality of booting bit values from the booting program in a storage space by the booting program according to the selected plurality of codes, and looking for at least one kernel bit value set each having a plurality of kernel bit value from the operating system kernel in the storage space by the booting program and a position of each of the plurality of kernel bit values in the kernel bit value set corresponding thereto, the booting bit value sets corresponding sequence to the kernel bit value sets; computing a reversible hash function to each of the booting bit value set and one of the kernel bit value set corresponding thereto by the booting program, to obtain a hash value corresponding thereto, respectively; and replacing each of the plurality of kernel bit values of the kernel bit value set at the position of each of the plurality of kernel bit values of the kernel bit value set with the hash value corresponding thereto by the booting program, respectively, and saving the kernel bit value set with the hash value replaced as the operating system kernel, to encrypt the operating system kernel, the encrypted operating system kernel being not executable.

According to the first embodiment of the present invention, a decryption method applied on an operating system kernel, being suitable for use on a device having a booting program and the operating system kernel having been encrypted correspondingly, comprising steps of extracting a plurality of codes having been recorded by the booting program; looking for at least one booting bit value sets each having a plurality of booting bit values from the booting program in a storage space by the booting program according to the selected plurality of codes, and looking for at least one kernel bit value sets each having a plurality of kernel bit values from the operating system kernel in the storage space by the booting program and a position of each of the plurality of kernel bit values corresponding thereto, the booting bit value sets corresponding to the kernel bit value sets; computing a reversible hash function to each of the booting bit value set and one of the kernel bit value set corresponding thereto by the booting program, to obtain a reversible-computed hash value corresponding thereto, respectively; and replacing each of the plurality of kernel bit values of the kernel bit value set at the position of each of the plurality of kernel bit values of the kernel bit value set with the reversible-computed hash value corresponding thereto by the booting program, respectively, and saving the kernel bit value set with the hash value replaced as the operating system kernel, to decrypt the operating system kernel, the decrypted operating system kernel being not executable.

According to the a second aspect of the present invention, an encryption method applied on an operating system kernel, being suitable for use on a device having a booting program and the operating system kernel stored therein, comprising steps of pre-establishing a definition table in the booting program, the definition table having codes stored therein; selecting randomly a plurality of codes from the definition table by the booting program and recording the plurality of codes having been selected by the booting program when the booting program is executed at a first time; looking for at least one booting bit value set each having a plurality of booting bit values from the booting program in a storage space by the booting program according to the selected plurality of codes, and looking for at least one kernel bit value set each having a plurality of kernel bit value from the operating system kernel in the storage space by the booting program and a position of each of the plurality of kernel bit values in the kernel bit value set corresponding thereto, the booting bit value sets corresponding sequence to the kernel bit value sets; computing a reversible hash function to each of the booting bit value set and one of the kernel bit value set corresponding thereto by the booting program, to obtain a binary hash value corresponding thereto, respectively; and replacing each of the plurality of kernel bit values of the kernel bit value set at the position of each of the plurality of kernel bit values of the kernel bit value set with the binary hash value corresponding thereto by the booting program, respectively, and saving the kernel bit value set with the hash value replaced as the operating system kernel, to encrypt the operating system kernel, the encrypted operating system kernel being not executable.

According to the second aspect of the present invention, a decryption method applied on an operating system kernel, being suitable for use on a device having a booting program and the operating system kernel having been encrypted correspondingly, comprising steps of extracting a plurality of codes having been recorded by the booting program and a bit number of a binary hash value having been recorded; looking for at least one booting bit value set each having a plurality of booting bit values from the booting program in a storage space by the booting program according to the selected plurality of codes and the bit number of the binary hash value having been recorded, and looking for at least one kernel bit value sets each having a plurality of kernel bit values from the operating system kernel in a storage space by the booting program and a position of each of the plurality of kernel bit values corresponding thereto, the booting bit value sets corresponding to the kernel bit value sets; computing a reversible hash function to each of the plurality of booting bit values of the booting bit value set and one of the plurality of kernel bit values of the kernel bit value set corresponding thereto by the booting program, to obtain the binary hash value corresponding thereto, respectively; and deleting the kernel bit value set when each of the plurality of kernel bit values of the kernel bit value set at the position of each of the plurality of kernel bit values is compared as being consistent with the binary hash value corresponding thereto, to decrypt the operating system kernel and execute the decrypted operating system kernel. The encryption and decryption methods of the present invention have the difference as compared to the prior art that the hash result is obtained from the computation between the booting program and the operating system kernel by using the definition table, the computation result is combined with the operating system kernel for encryption of the operating system kernel, and the operating system kernel may not be decrypted and thus booted whenever the booting program, the operating system kernel or the two combined are falsified or replaced.

By using the above technical means, the present invention may achieve the technical efficacy that the booting program and the operating system kernel may be authenticated bilaterally for safety booting.

BRIEF DESCRIPTION OF THE DRAWINGS

The present invention will be better understood from the following detailed descriptions of the preferred embodiments according to the present invention, taken in conjunction with the accompanying drawings, in which:

FIG. 3 is a schematic diagram of a definition table used for the encryption method applied on the operating system kernel according to the present invention;

DETAILED DESCRIPTION

The present invention will be apparent from the following detailed description, which proceeds with reference to the accompanying drawings, wherein the same references relate to the same elements.

Figure 1:
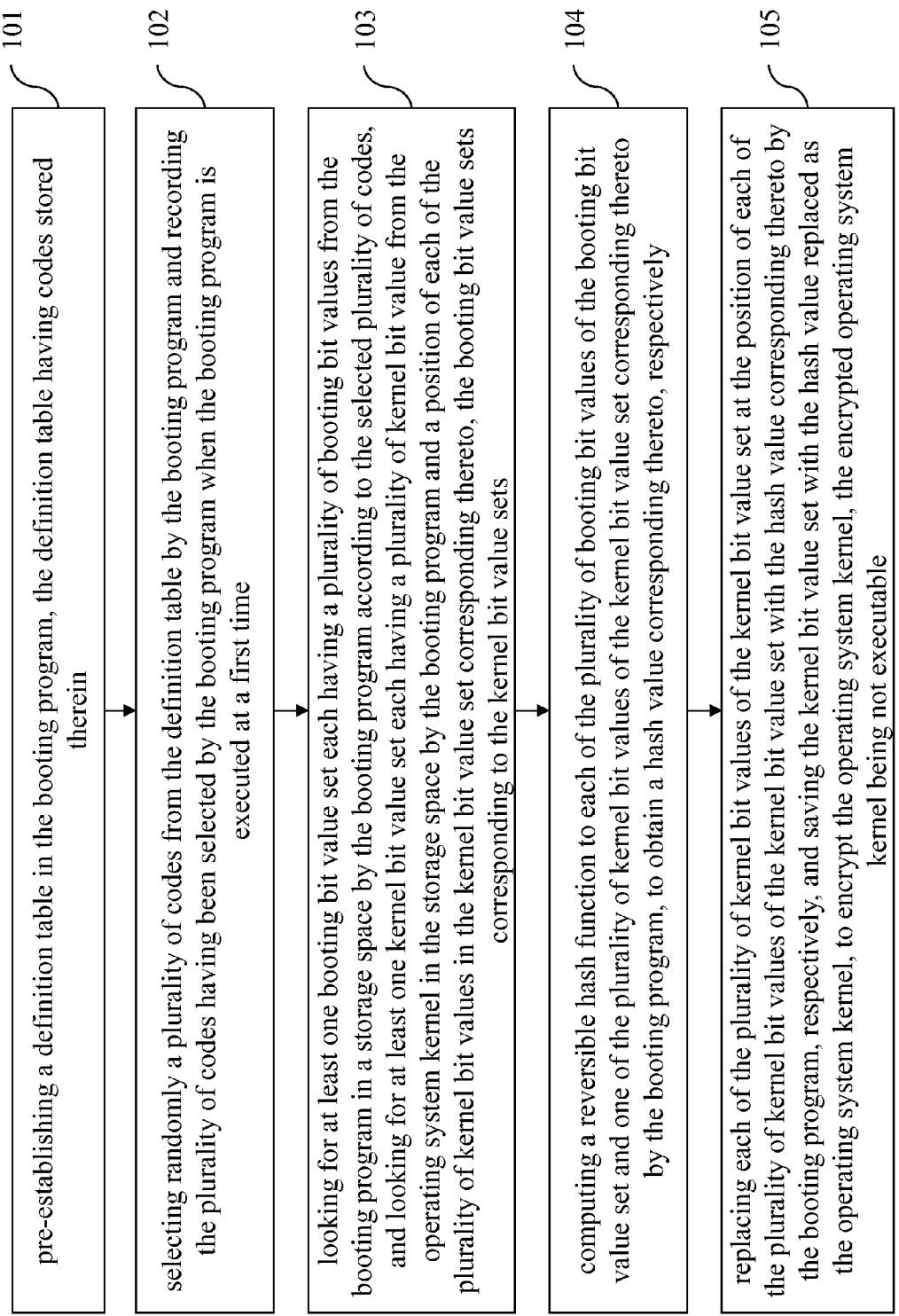
FIG. 1 is a flowchart of an encryption method applied on an operating system kernel according to a first embodiment of the present invention.
Figure 2:
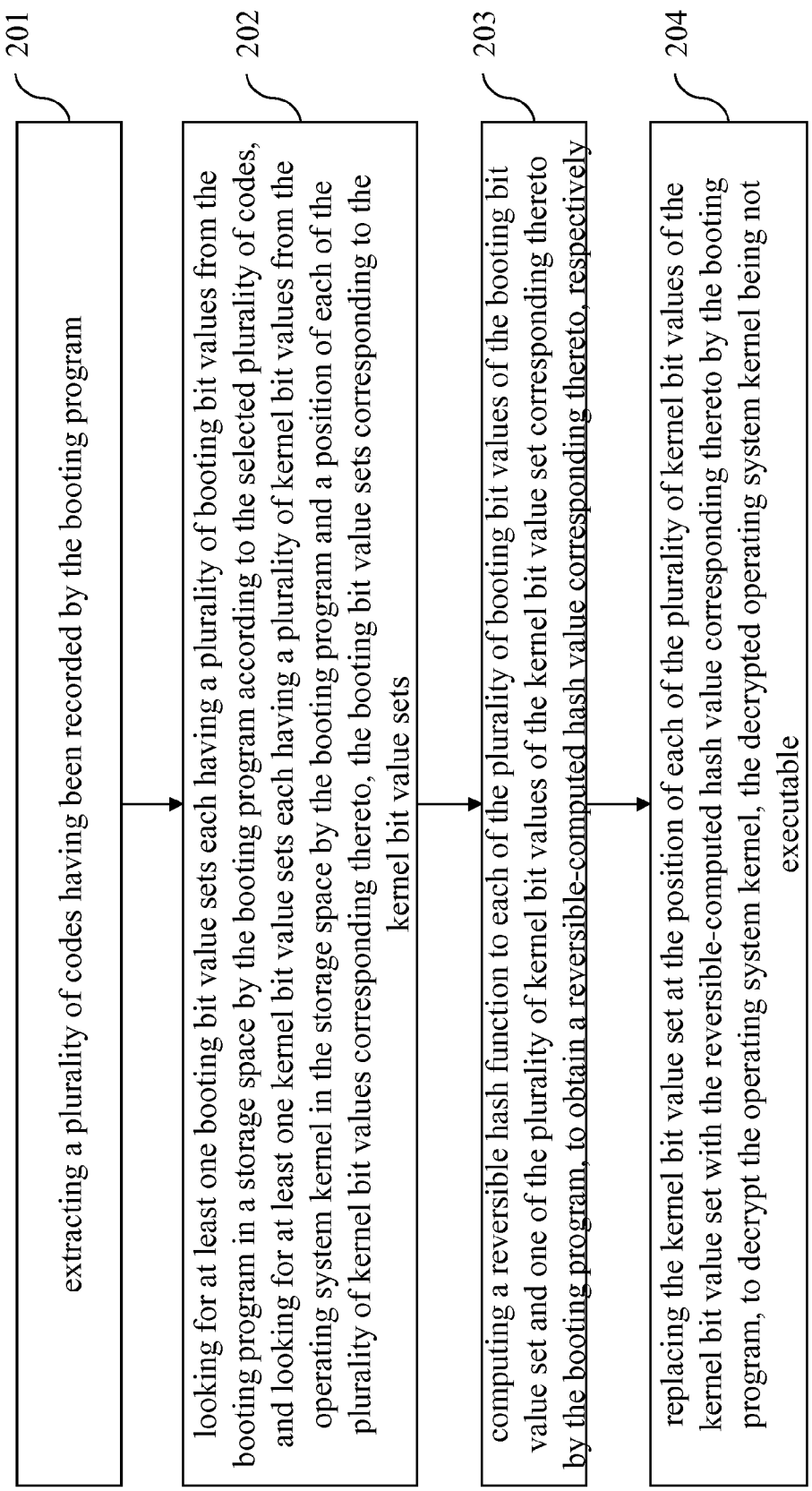
FIG. 2 is a flowchart of a decryption method applied on the operating system kernel according to the first embodiment of the present invention.

According to a first embodiment of the present invention, an encryption method applied on an operating system kernel is suitable for use on a device having a booting program and the operating system kernel stored therein, and which will be described by setting forth a preferred embodiment for its operation and process flow. And, this embodiment will be explained with reference simultaneously to FIG. 1 and FIG. 2, in which FIG. 1 is a flowchart of an encryption method applied on an operating system kernel according to a first embodiment of the present invention, while FIG. 2 is a flowchart of a decryption method applied on the operating system kernel according to the first embodiment of the present invention.

Figure 3:
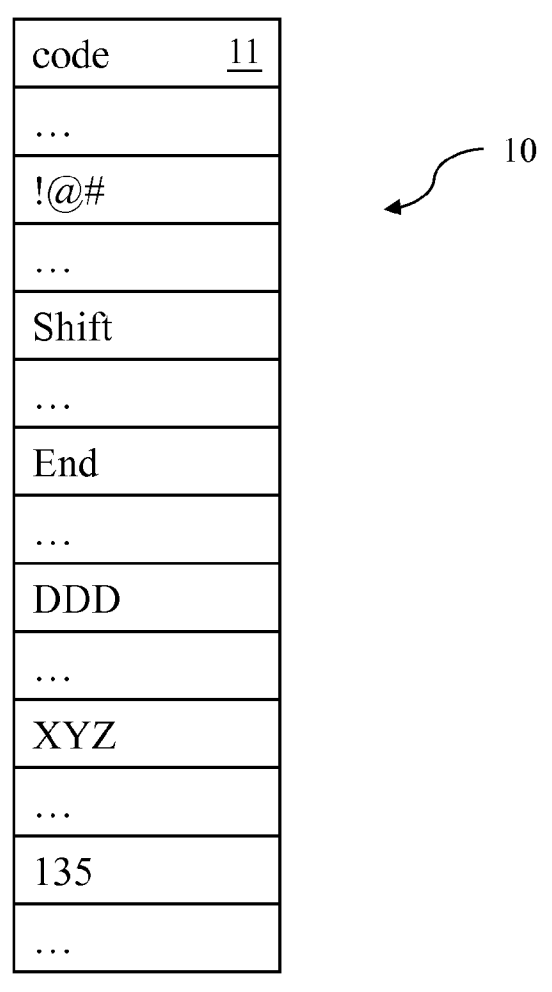

Referring to FIG. 3 first, and which is a schematic diagram of a definition table used for the encryption method applied on the operating system kernel according to the present invention.

In the booting program, a definition table 10 is pre-established, in which a plurality of codes 11 are stored (S101). In FIG. 2, code 11 is "!@#", which represents "selecting 4 bits". Code 11 is "Shift", which represents "the $10^{th}$ bit", code 11 is "End", which represents "the $50^{th}$ bit", code 11 is "DDD", which represents "forward shift", code 11 is "XYZ", which represents "backward shift", and code 11 is "135", which represents "shifted by 20 bits". Namely, each of the codes 11 stored in the definition table 10 represents one of a selected bit number, a designated bit, a forward shift, a backward shift and a shifted bit number. These are merely examples, without limiting the present invention.

When the booting program is executed for the first time, the booting program may randomly select from the definition table 10 a first code "!@#", a second code "Shift", a third code "XYZ" and a fourth code "135". According to the above codes, it is pointed out that "selecting four bits from the $10^{th}$ bit, and selecting four bits beginning from 20 bits shift backwards from the $10^{th}$ bits". This is merely an example, without limiting the present invention. Further, the booting program may record the selected first code as "!@#", the selected second code as "Shift", the selected third code as "XYZ", and the selected fourth code as "135" (S102).

Thereafter, assume the $10^{th}$ bit to the $13^{th}$ bit of the original booting program in the storage space are "1010", and the $30^{th}$ bit to the $33^{rd}$ bit of the original booting program in the storage space are "0110". The booting program may locate a first booting bit value set by four bits in a storage space of the booting program from the $10^{th}$ bit "1010", according to the selected first code "!@#", the selected second code "Shift", the selected third code as "XYZ", and the selected fourth code "135" (S103).

Then, the booting program may locate a second booting bit value set by four bits in a storage space of the booting program beginning from 20 bits shift backwards from the $10^{th}$ bit as "0110", according to the selected first code "!@#", the selected second code "Shift", the selected third code "XYZ", and the selected fourth code "135" (S103).

Next, assume the $10^{th}$ bit to the $13^{th}$ bit of the original booting program in the storage space are "1111", and the $30^{th}$ bit to the $33^{rd}$ bit of the original booting program in the storage space are "0011". The booting program may locate a first kernel bit value set by four bits in a storage space of the booting program from the 10th bit as "1111", i.e. the bit values of the 10$^{th}$ bit to the 13$^{th}$ bit of the operating system kernel, according to the selected first code as "!@#", the selected second code as "Shift", the selected third code as "XYZ", and the selected fourth code as "135" (S103).

Next, the booting program may locate a second kernel bit value set by four bits in a storage space of the booting program beginning from 20 bits shift backwards from the 10$^{th}$ bit as "0011", i.e. the bit values of the 30$^{th}$ bit to the 33$^{rd}$ bit of the booting program, according to the selected first code "!@#", the selected second code "Shift", the selected third code "XYZ", and the selected fourth code "135" (S103).

Furthermore, the first booting bit value set "1010" may correspond to the first kernel bit value set "1111" (S103), and the second booting bit value set "0110" may also correspond to the second kernel bit value set "0011" (S103).

Thereafter, the first booting bit value set "1010" and the first kernel bit value set "1111" are subject together to an irreversible hash function by the booting program. In a preferable embodiment, the irreversible hash function is a "logic XOR operation", and which may otherwise be a "bitwise operation". These are merely examples, without limiting the present invention. A first hash result "0101" is obtained when the logic XOR operation is applied onto the first booting bit value set "1010" and the first kernel bit value set "1111" (S104).

Thereafter, the second booting bit value set "0110" and the second kernel bit value set "0011" are subject together to an irreversible hash function by the booting program. In a preferable embodiment, the irreversible hash function is a "logic XOR operation". A second hash result "0101" is obtained when the logic XOR operation is applied onto the second booting bit value set "0110" and the second kernel bit value set "0101" (S104).

Subsequently, the booting program replaces the kernel bit values "1111" at first kernel bit positions "from the to the 10$^{th}$ bit to the 13$^{th}$ bit" with the corresponding first hash value "0101", and the kernel bit values "0011" at second kernel bit positions "from the 30$^{th}$ bit to the 33$^{rd}$ bit" with the corresponding first hash value "0101". Then, the operating system kernel is stored again (S105).

By means of the above process, the operating system may be encrypted and the thus encrypted operating system kernel may not be executed.

Thereafter, when the booting program is executed for the first time and the operating system kernel has been finished with the encryption, or the booting program is not executed for the first time, the booting program will extract the recorded first code "!@#", the recorded second code "Shift", the third recorded code "XYZ", and the fourth recorded code "135" (201).

Thereafter, the booting program may locate the first booting bit value set "1010", i.e. the values of the 10th bit to the 13$^{th}$ bit, from a storage space of the booting program according to the selected first code "!@#", the recorded second code "Shift", the recorded third code "XYZ" and the recorded fourth code "135" (S202).

Then, the booting program may locate a second booting bit value set by four bits in a storage space of the booting program beginning from 20 bits shift backwards from the 10$^{th}$ bit as "0110", i.e. the values of the 30$^{th}$ bit to the 33$^{rd}$ bit of the booting program, according to the selected first code "!@#", the selected second code "Shift", the selected third code "XYZ", and the selected fourth code "135" (S202).

Thereafter, the booting program may locate the first booting bit value set "0101", i.e. the values of the 10$^{th}$ bit to the 13$^{th}$ bit, from a storage space of the booting program according to the selected first code "!@#", the recorded second code "Shift", the recorded third code "XYZ" and the recorded fourth code "135", and the position of the first kernel bit value set "0101" is also located as "the 10$^{th}$ bit to the 13$^{th}$ bit" (S202).

Next, the booting program may locate a second kernel bit value set by four bits in a storage space of the booting program beginning from 20 bits shift backwards from the 10$^{th}$ bit as "0101", i.e. the bit values of the 30$^{th}$ bit to the 33$^{rd}$ bit of the booting program, according to the selected first code "!@#", the selected second code "Shift", the selected third code "XYZ", and the selected fourth code "135", and the position of the second kernel bit value set "0101" is also located as "the 30$^{th}$ bit to the 33$^{rd}$ bit" (S202).

Furthermore, the first booting bit value set "1010" may correspond to the first kernel bit value set "1111" (S202), and the second booting bit value set "0110" may also correspond to the second kernel bit value set "0101" (S202).

Thereafter, the first booting bit value set "1010" and the first kernel bit value set "0101" are subject together to an irreversible hash function by the booting program. In a preferable embodiment, the irreversible hash function is a "logic XOR operation", and which may otherwise be a "bitwise operation". These are merely examples, without limiting the present invention. A first hash result "1111" is obtained when the logic XOR operation is applied onto the first booting bit value set "1010" and the first kernel bit value set "0111" (S203).

Thereafter, the second booting bit value set "0110" and the second kernel bit value set "0101" are subject together to an irreversible hash function by the booting program. In a preferable embodiment, the irreversible hash function is a "logic XOR operation". A second hash result "0011" is obtained when the logic XOR operation is applied onto the second booting bit value set "0110" and the second kernel bit value set "0101" (S203).

Subsequently, the booting program replaces the first kernel bit values "0101" at first kernel bit positions "from the to the 10$^{th}$ bit to the 13$^{th}$ bit" with the corresponding first hash value "0011", and the kernel bit values "0011" at second kernel bit positions "from the 30$^{th}$ bit to the 33$^{rd}$ bit" with the corresponding first irreversible hash value "0011". As such, the operating system kernel may be restored back to the original operating system kernel (S204).

By means of the above process, the operating system may be decrypted, and the thus-decrypted operating system kernel may be executed.

Assume the booting program is falsified, the 10$^{th}$ to 13$^{th}$ bits are amended into "0000", and the 30$^{th}$ to 33$^{rd}$ bits "1111" in the booting program at this time, the booting program may locate four bits as the first booting bit value set "0000", i.e. the values of the 10$^{th}$ to 13$^{th}$ bits from the storage space of the booting program according to the selected first code "!@#", the selected second code "Shift", the selected third code "XYZ", and the selected fourth code "135".

Thereafter, the booting program may locate four bits as the first booting bit value set "1111", i.e. the values of the four bits beginning from a 20 bits backward shift from the 10$^{th}$ bit, the 30$^{th}$ to 33$^{rd}$ bits, from the storage space of the booting program beginning from the 10$^{th}$ bit according to the selected first code "!@#", the selected second code "Shift", the selected third code "XYZ", and the selected fourth code "135".

Thereafter, the booting program may locate the first kernel bit value set "0101", i.e. the values of the 10$^{th}$ to 13$^{th}$ bits, the positions of the first kernel bits, from the storage space of the booting program, according to the selected first code "!@#", the selected second code "Shift", the selected third code "XYZ", and the selected fourth code "135".

Thereafter, the booting program may locate the second booting bit value set "0101" from the values of the four bits beginning from a 20 bits backward shift from the 10th bit, the $30^{th}$ to $33^{rd}$ bits, from the storage space of the booting program, and the second kernel bit value set "0101" at the positions of the second kernel bits "the $30^{th}$ to the $33^{rd}$ bits" according to the selected first code "!@#", the selected second code "Shift", the selected third code "XYZ", and the selected fourth code "135".

Furthermore, the first booting bit value set is "0000" corresponds to the first kernel bit value set is "0101", and the second booting bit value set is "1111" corresponds to the second kernel bit value set is "0101".

Thereafter, the first booting bit value set "0000" and the first kernel bit value set "0101" are subject together to an irreversible hash function by the booting program. In a preferable embodiment, the irreversible hash function is a "logic XOR operation", whose irreversible operation is also the "logic XOR operation". A first hash result "0101" is obtained when the logic XOR operation is applied onto the first booting bit value set "0101" and the first kernel bit value set "0101".

The booting program may subject the second booting bit value set "1111" and the second kernel bit value set "0101" together to the irreversible hash function. In a preferable embodiment, the irreversible hash function is a "logic XOR operation", and whose irreversible operation is also the "logic XOR operation". A second hash result "1010" is obtained when the logic XOR operation is applied onto the second booting bit value set "1111" and the second kernel bit value set "0101".

Subsequently, the booting program replaces the first kernel bit values "0101" at first kernel bit positions "from the to the $10^{th}$ bit to the $13^{th}$ bit" with the corresponding first irreversible hash value "0101", and the second kernel bit values "0101" at second kernel bit positions "from the $30^{th}$ bit to the $33^{rd}$ bit" with the corresponding first irreversible hash value "0011". As such, the operating system kernel may not be restored back to the original operating system kernel, and the operating system kernel may not be executed.

Assume the booting program is falsified, the $10^{th}$ to $13^{th}$ bits are amended into "0000", and the $30^{th}$ to $33^{rd}$ bits "1111" in the booting program at this time, the booting program may locate four bits as the first booting bit value set "1010", i.e. the values of the $10^{th}$ to $13^{th}$ bits from the storage space of the booting program which are falsified, according to the selected first code "!@#", the selected second code "Shift", the selected third code "XYZ", and the selected fourth code "135".

Thereafter, the booting program may locate four bits as the second booting bit value set "0110", i.e. the values of the four bits beginning from a 20 bits backward shift from the $10^{th}$ bit, at the position of the $30^{th}$ to $33^{rd}$ bits, from the storage space of the booting program according to the selected first code "!@#", the selected second code "Shift", the selected third code "XYZ", and the selected fourth code "135".

Thereafter, the booting program may locate the first kernel bit value set "0000", i.e. the values of the $10^{th}$ to $13^{th}$ bits, the positions of the first kernel bits, which are simultaneously located, from the storage space of the booting program, according to the selected first code "!@#", the selected second code "Shift", the selected third code "XYZ", and the selected fourth code "135".

Thereafter, the booting program may locate the second booting bit value set "1111" from the values of the four bits beginning from a 20 bits backward shift from the $10^{th}$ bit, the $30^{th}$ to $33^{rd}$ bits, from the storage space of the booting program, and the second kernel bit value set "1111" at the positions of the second kernel bits "the $30^{th}$ to the $33^{rd}$ bits", according to the selected first code "!@#", the selected second code "Shift", the selected third code "XYZ", and the selected fourth code "135".

Furthermore, the first booting bit value set is "1010" corresponds to the first kernel bit value set is "0000", and the second booting bit value set is "0110" corresponds to the second kernel bit value set is "1111".

Thereafter, the first booting bit value set "1010" and the first kernel bit value set "0000" are subject together to an irreversible hash function by the booting program. In a preferable embodiment, the irreversible hash function is a "logic XOR operation", whose irreversible operation is also the "logic XOR operation". A first hash result "1010" is obtained when the logic XOR operation is applied onto the first booting bit value set "1010" and the first kernel bit value set "0000".

The booting program may subject the second booting bit value set "0110" and the second kernel bit value set "1111" together to the irreversible hash function. In a preferable embodiment, the irreversible hash function is a "logic XOR operation", and whose irreversible operation is also the "logic XOR operation". A second hash result "1001" is obtained when the logic XOR operation is applied onto the second booting bit value set "0110" and the second kernel bit value set "1111".

Subsequently, the booting program replaces the first kernel bit values "0000" at first kernel bit positions "from the to the $10^{th}$ bit to the $13^{th}$ bit" with the corresponding first irreversible hash value "1010", and the second kernel bit values "1111" at second kernel bit positions "from the $30^{th}$ bit to the $33^{rd}$ bit" with the corresponding first irreversible hash value "1001". As such, the operating system kernel may not be restored back to the original operating system kernel, and the operating system kernel may not be executed.

As such, a device having the booting program and the operating system kernel stored therein may be provided to be booted safely, the booting program is used to be computed together with the operating system kernel, avoiding a large amount of computation verification and thus a prolonged system booting time, one time of computation may authenticate mutually the booting program and the operating system kernel, there is no information swap between the booting program and the operating system kernel, the hash value may be avoided from being transmitted and thus stolen, and different devices may have different encryption ways although their operating systems are the same and thus the decryption information or ways of one such device may not be acquired by the operating system kernels on any of the other such devices.

In addition, when a re-encrypt operating system kernel encryption condition is triggered or one of the booting program and the operating system is updated, all the steps of the operating system decryption method are first performed and then an encryption process corresponding to the operating system kernel is performed. Among them, the re-encrypt operating system kernel condition includes a multiple times booting failure condition, a time condition, and a command condition. These are merely examples, without limiting the present invention. When a multiple times booting failure condition is triggered, a brute-force attack is determined as having occurred and an associated measure may be provided to avoid from being resolved owing to the brute force. The time condition may be the operating system kernel timely capable of being differently encrypted. The command condition may be the operating system kernel capable of being conducted with an amended encryption directly by a user. As such, the user may rapidly and conveniently perform the operating system kernel encryption and decryption, and the re-encrypt operating system kernel encryption is facilitated to be conducted.

Figure 4:
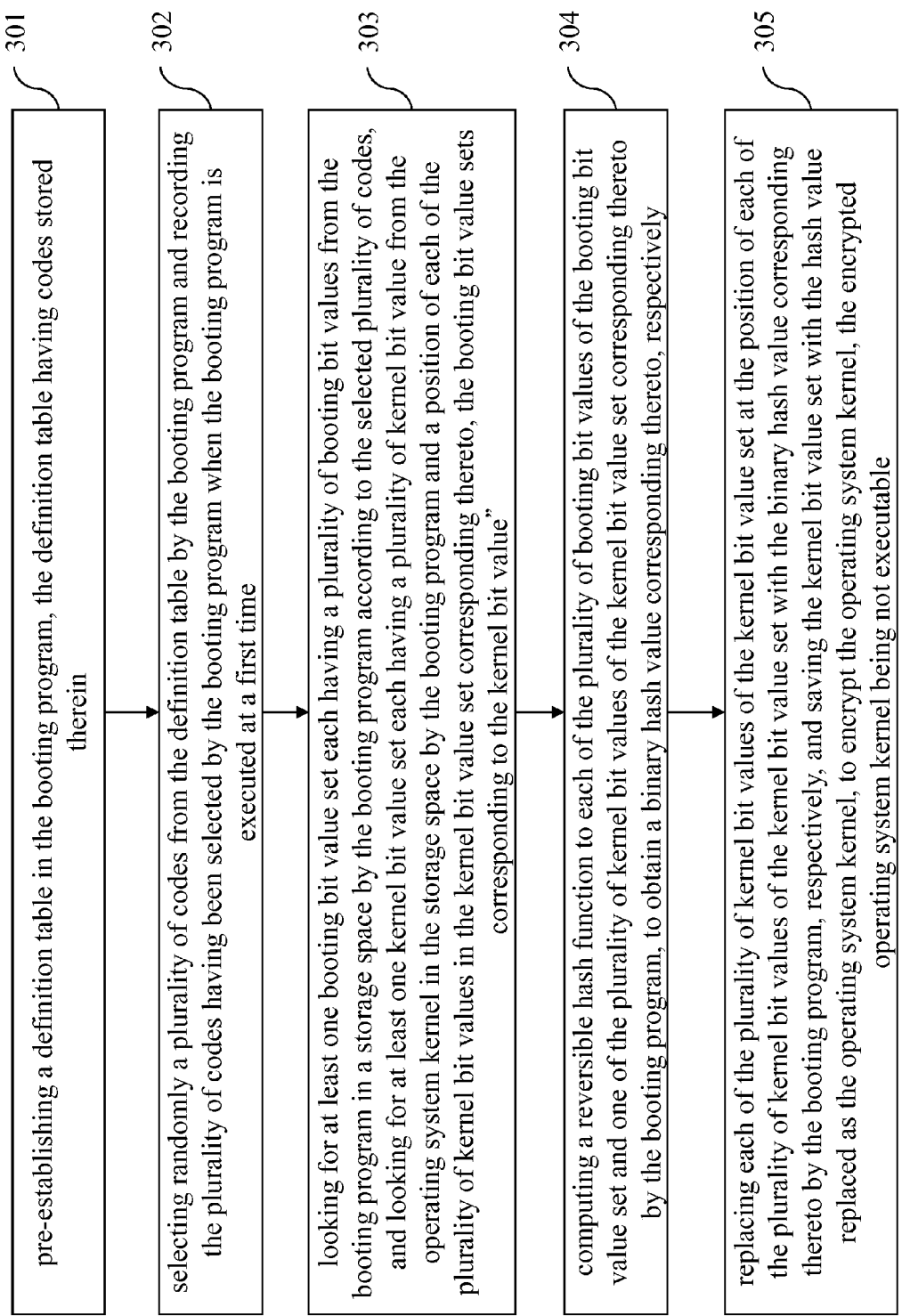
FIG. 4 is a flowchart of the encryption method applied on the operating system kernel according to a second aspect of the present invention.
Figure 5:
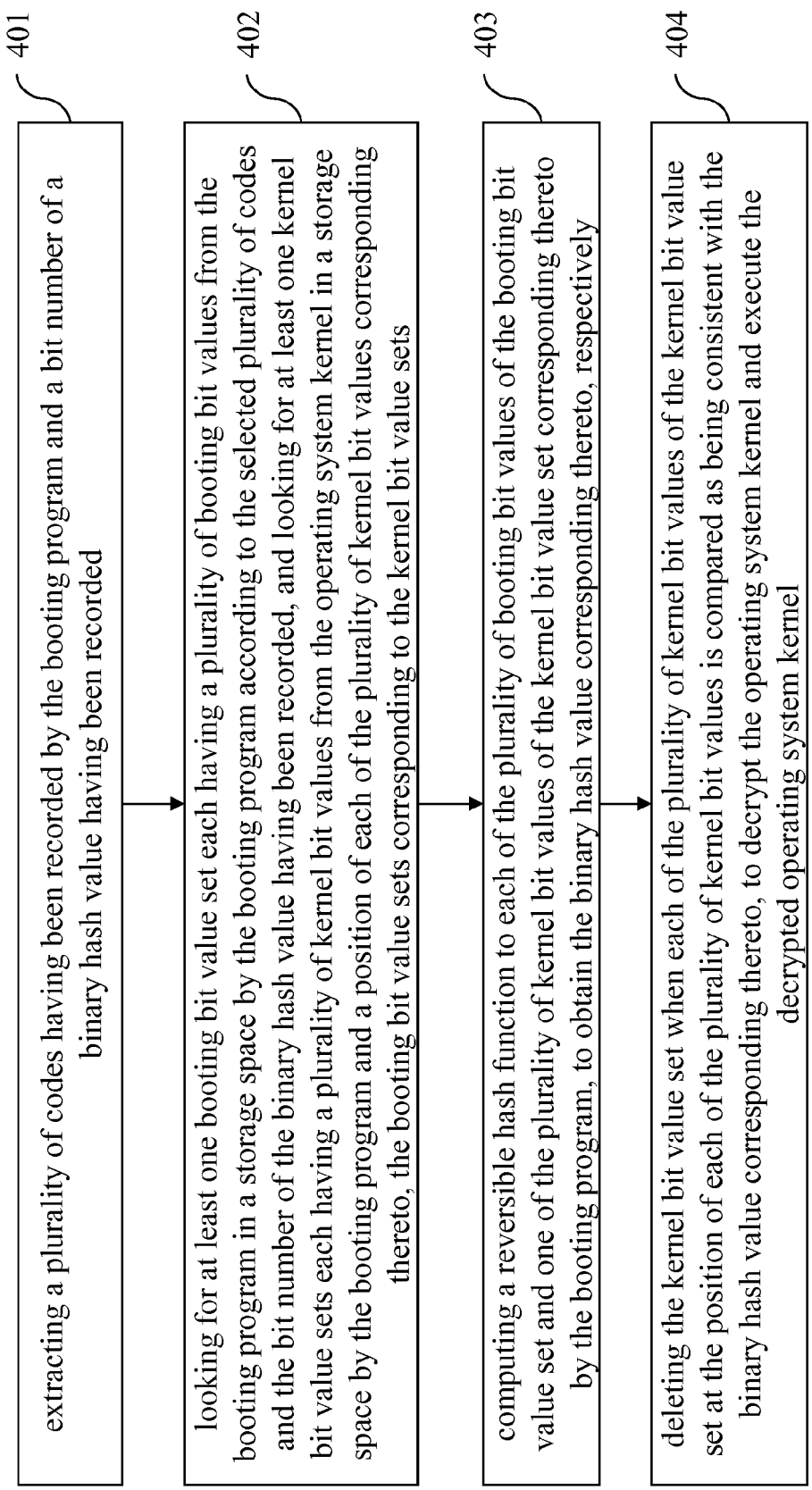
FIG. 5 is a flowchart of the decryption method applied on the operating system kernel according to the second aspect of the present invention.

According to a second aspect of the present invention, the encryption method applied on the operating system kernel, being suitable for use on a device having a booting program and the operating system kernel stored therein, which will be explained in its operation and process flow with simultaneously reference to FIG. 3, FIG. 4 and FIG. 5, in which FIG. 4 is a flowchart of the encryption method applied on the operating system kernel according to a second aspect of the present invention, and FIG. 5 is a flowchart of the decryption method applied on the operating system kernel according to the second aspect of the present invention.

In the booting program, a definition table 10 is pre-established, in which a plurality of codes 11 are stored (S301), and the definition table 10 may be referred to FIG. 2. When the booting program is the first time executed, the booting program will randomly select from the definition table 10 a first code "!@#", a second code "End", a third code "DDD", and a fourth code 11 "135". These codes represent "selecting 4 bits from the $50^{th}$ bit, and reselecting 4 bits from 20 bits shifted forwards beginning from the $50^{th}$ bit". These are merely examples, without limiting the present invention. The booting program will record the selected first code as "!@#", the second code as "End", the third code as "DDD", and the fourth code as "135" (S302).

Thereafter, assume the $50^{th}$ bit to the $53^{th}$ bit of the original booting program in the storage space are "1010", and the $30^{th}$ bit to the $33^{th}$ bit of the original booting program in the storage space are "0110". The booting program may locate a first booting bit value set by four bits in a storage space of the booting program from the $10^{th}$ bit "1010", according to the selected first code "!@#", the selected second code "End", the selected third code as "DDD", and the selected fourth code "135" at positions of the $50^{th}$ to the $53^{th}$ bits in the booting program (S303).

Then, the booting program may locate a second booting bit value set by four bits in the storage space of the booting program from 20 bits shifted forwards beginning from the 50 bits as "0110", according to the selected first code "!@#", the selected second code "End", the selected third code as "DDD", and the selected fourth code "135" at positions of the 30th to the 33th bits (S303).

Next, assume the $10^{th}$ bit to the $13^{th}$ bit of the original booting program in the storage space are "1111", and the $30^{th}$ bit to the $33^{th}$ bit of the original booting program in the storage space are "0011". The booting program may locate a first kernel bit value set by four bits in a storage space of the booting program from the $50^{th}$ bit as "1111", i.e. the bit values of the $10^{th}$ bit to the $13^{th}$ bit of the operating system kernel, according to the selected first code as "!@#", the selected second code "End", the selected third code as "DDD", and the selected fourth code as "135" (S303).

Next, the booting program may locate a second kernel bit value set by four bits in a storage space of the booting program from 20 bits shifted forwards beginning from the $50^{th}$ bit as "0011", i.e. the bit values of the $30^{th}$ bit to the $33^{th}$ bit of the booting program, according to the selected first code "!@#", the selected second code "End", the selected third code as "DDD", and the selected fourth code "135" (S303).

Further, the first booting bit value set "1010" corresponds to the first kernel bit value set "1111" (S303), and the second booting bit value set "0110" corresponds to the second kernel bit value set "0011" (S303).

Thereafter, the booting program launches an irreversible hash function onto the first booting bit value set "1010" and the first kernel bit value set "1111". In a preferred embodiment, the irreversible hash function is an "MD5 operation", and may also be "SHA-1, SHA-224, SHA-256, SHA-384, SHA-512, MD2, MD3, and MD4 operations". These are merely examples, without limiting the present invention. After the MD5 operation, a result obtained from the first booting bit value set "1010" and the first kernel bit value set "1111" is then converted into a binary result, assumed as "111100001010010100001111", which is a desired first binary hash value "111100001010010100001111". And, the booting program may record the first binary hash value experiencing the computation as having a bit number of "24" (S304).

The booting program launches the irreversible hash function onto the second booting bit value set "0011" and the second kernel bit value set "0011". In a preferred embodiment, the irreversible hash function is an "MD5 operation". After the MD5 operation, a result obtained from the first booting bit value set "0110" and the first kernel bit value set "0011" is then converted into a binary result, assumed as "101000001010010100000101", which is a desired second binary hash value "101000001010010100000101". And, the booting program may record the second binary hash value experiencing the computation as having a bit number of "24" (S304).

Thereafter, the booting program inserts the first binary has value "111100001010010100001111" prior to the first kernel bit position "the $50^{th}$ bit", according to the third code "DDD". In addition, the booting program inserts the second binary has value "101000001010010100000101" prior to the second kernel bit position "the $30^{th}$ bit", according to the third code "DDD", and the operating system kernel is stored again (S305).

By means of the above process, the operating system kernel may be encrypted, and the thus encrypted operating system kernel cannot be executed.

Thereafter, when the booting program is executed for the first time and the operating system kernel has been finished with the encryption, or the booting program is not executed for the first time, or the booting program is not executed for the first time, the booting program may first extract the recorded first code "!@#", the recorded second code "End", the recorded third code "DDD" and the recorded fourth code "135", the recorded first hash value bit number "24" and the recorded second hash value bit number "24" (S401).

Then, the booting program may locate a first booting bit value set by four bits in the storage space of the booting program beginning from 50 bits as "1010", i.e. the values of the $50^{th}$ bit to the $53^{th}$ bit of the booting program, according to the selected first code "!@#", the selected second code "End", the selected third code "DDD", and the selected fourth code "135" (S402).

Next, the booting program may locate a second kernel bit value set by four bits in a storage space of the booting program from 20 bits forward shift beginning from the $20^{th}$ bit as "0110", i.e. the values of the $30^{th}$ bit to the $33^{th}$ bit of the booting program, according to the selected first code "!@#", the selected second code "End", the selected third code "DDD", and the selected fourth code "135" (S402).

Thereafter, the booting program may locate a first kernel bit value set by four bits in the storage space of the booting program from 98 bits, i.e. the $50^{th}$ bit pluses 48 bits, as "0101", i.e. the values of the $98^{th}$ bit to the $102^{th}$ bit of the booting program, and the positions of the first kernel bits "the $74^{th}$ bit to the $97^{th}$ bit, "according to the selected first code "!@#", the selected second code "End", the selected third code "DDD", and the selected fourth code "135" (S402).

Thereafter, the booting program may locate a second kernel bit value set by four bits in the storage space of the booting program from a 44 bits forward shift beginning from the $98^{th}$ bit, i.e. the $50^{th}$ bit pluses 48 bits, as "0101", i.e. the values of the $98^{th}$ bit-44 bits, and the positions of the second kernel bits "the $30^{th}$ bit to the $53^{th}$ bit", i.e. the $54^{th}$ bit-24bits to the 54bits-1 bit, according to the selected first code "!@#", the selected second code "End", the selected third code "DDD", the selected fourth code "135", the first binary hash bit number "24", and the second binary hash value bit number "24" (S402).

Furthermore, the first booting bit value set "1010" corresponds to the first kernel bit value set "0101" (S402), and the second booting bit value set "0110" corresponds to the second kernel bit value set "0101" (S402).

Thereafter, the booting program launches the irreversible hash function onto the first booting bit value set "1010" and the first kernel bit value set "0101". In a preferred embodiment, the irreversible hash function is an "MD5 operation". After the MD5 operation, a result obtained from the first booting bit value set "1010" and the first kernel bit value set "0101" is then converted into a binary result, assumed as "111100001010010100001111", which is a desired second binary hash value "101000001010010100000101" (S403).

The booting program launches the irreversible hash function onto the second booting bit value set "0110" and the second kernel bit value set "0101". In a preferred embodiment, the irreversible hash function is an "MD5 operation". After the MD5 operation, a result obtained from the second booting bit value set "0110" and the second kernel bit value set "0101" is then converted into a binary result, assumed as "101000001010010100000101", which is a desired second binary hash value "101000001010010100000101" (S403).

Thereafter, the booting program compares the first kernel bit positions "the $74^{th}$ bit to the $97^{th}$ bits" having the kernel bit values "111100001010010100001111" with the first binary hash value "111100001010010100001111" as being consistent. Namely, the kernel bit value "111100001010010100001111" of the first kernel bit positions "the $74^{th}$ to the $97^{th}$ bits" may be deleted.

On the other hand, the booting program compares the second kernel bit positions "the $30^{th}$ bit to the $53^{th}$ bits" having the kernel bit values "101000001010010100000101" with the second binary hash value "101000001010010100000101" as being consistent. Namely, the kernel bit value "101000001010010100000101" of the first kernel bit positions "the $30^{th}$ to the $53^{th}$ bits" may be deleted, thereby the original operating system kernel may be restored (S404).

By means of the above process, the operating system kernel may be decrypted, and the thus decrypted operating system kernel may be executed.

Assume the booting program is falsified, the $50^{th}$ to $53^{th}$ bits are amended into "0000", and the $30^{th}$ to $33^{th}$ bits "1111" in the booting program at this time, the booting program may locate four bits as the first booting bit value set "0000", i.e. the values of the $10^{th}$ to $13^{th}$ bits from the storage space of the falsified booting program according to the selected first code "!@#", the selected second code "End", the selected third code "DDD", and the selected fourth code "135".

Thereafter, the booting program may locate four bits as the second booting bit value set "0101", i.e. the values of the $98^{th}$, i.e. the $50^{th}$ bit pluses 48 bits, to $102^{th}$ bits of the booting program, from the storage space of the booting program beginning from the $50^{th}$ bit, and the corresponding first kernel bit positions "the $74^{th}$ bit to the $97^{th}$ bit", the $98^{th}$ bit-24 bits to the $98^{th}$-1 bit, according to the selected first code "!@#", the selected second code "End", the selected third code "DDD", and the selected fourth code "135".

Thereafter, the booting program may locate a second kernel bit value set "0101", i.e. the bit value of the $54^{th}$ bit to the $57^{th}$ bit value, from the storage space of the operating system kernel from a 44 bits, the $98^{th}$ bit-the $44^{th}$ h bit, forward shift beginning from the $98^{th}$ bit, i.e. the $50^{th}$ bit+48 bits, and the corresponding second kernel bit positions "the $30^{th}$ bit to the $53^{th}$ bit", i.e. the $54^{th}$ bit-24 bits to the $54^{th}$ bit-1 bit, according to the selected first code "!@#", the selected second code "End", the selected third code "DDD", and the selected fourth code "135".

Furthermore, the first booting bit value set "0000" corresponds to the first kernel bit value set "0101", and the second booting bit value set "1111" corresponds to the second kernel bit value set "0101"

Thereafter, the booting program launches the irreversible hash function onto the first booting bit value set "0000" and the first kernel bit value set "0101". In a preferred embodiment, the irreversible hash function is an "MD5 operation". After the MD5 operation, a result obtained from the first booting bit value set "0000" and the first kernel bit value set "0101" is then converted into a binary result, assumed as "000000001010010100000000", which is a desired second binary hash value "000000001010010100000000".

The booting program launches the irreversible hash function onto the second booting bit value set "1111" and the second kernel bit value set "0101". In a preferred embodiment, the irreversible hash function is an "MD5 operation". After the MD5 operation, a result obtained from the second booting bit value set "1111" and the second kernel bit value set "0101" is then converted into a binary result, assumed as "101011111010010111110101", which is a desired second binary hash value "101011111010010111110101".

Thereafter, the booting program compares the first kernel bit positions "the $74^{th}$ bit to the $97^{th}$ bits" having the kernel bit values "111100001010010100001111" with the first binary hash value "000000001010010100000000" as being inconsistent. Namely, the kernel bit value "111100001010010100001111" of the first kernel bit positions "the $74^{th}$ to the $97^{th}$ bits" will not be deleted.

On the other hand, the booting program compares the second kernel bit positions "the $30^{th}$ bit to the $53^{th}$ bits" having the kernel bit values "101000001010010100000101" with the second binary hash value "101000001010010100000101" as being inconsistent. Namely, the kernel bit value "101000001010010100000101" of the first kernel bit positions "the $74^{th}$ to the $97^{th}$ bits" will not be deleted, thereby the original operating system kernel may not be restored and thus executed.

Assume the booting program is falsified, the $98^{th}$ to $102^{th}$ bits are amended into "0000", and the $54^{th}$ to $57^{th}$ bits "1111" in the booting program at this time, the booting program may locate four bits as the first booting bit value set "1010", i.e. the values of the $50^{th}$ to $53^{th}$ bits from the storage space of the falsified booting program according to the selected first code "!@#", the selected second code "End", the selected third code "DDD", and the selected fourth code "135".

Thereafter, the booting program may locate four bits as the second booting bit value set "0110", i.e. the values of the $30^{th}$ to 33$^{th}$ bits of the booting program, from the storage space of the booting program from a 20 bits forward shift beginning from the 50$^{th}$ bit, according to the selected first code "!@#", the selected second code "End", the selected third code "DDD", and the selected fourth code "135".

Thereafter, the booting program may locate a first kernel bit value set "0101", i.e. the bit value of the 54$^{th}$ bit to the 57$^{th}$ bit value, from the storage space of the operating system kernel by four bits from the 98$^{th}$ bit, i.e. the 50$^{th}$ bit+48 bits, and the corresponding first kernel bit positions "the 74$^{th}$ bit to the 97$^{th}$ bit", i.e. the 98$^{th}$ bit-24 bits to the 98$^{th}$ bit-1 bit, according to the selected first code "!@#", the selected second code "End", the selected third code "DDD", the selected fourth code "135", the first binary hash value bit number "24" and the second binary hash value bit number "24".

Thereafter, the booting program may locate a second kernel bit value set "1111", i.e. the bit value of the 54$^{th}$ bit to the 57$^{th}$ bit value, from the storage space of the operating system kernel by four bits from a 44 bits forward shift from the 98$^{th}$ bit, i.e. the 50$^{th}$ bit+48 bits, i.e. the 98$^{th}$ bit-44 bits, and the corresponding second kernel bit positions "the 30$^{th}$ bit to the 53$^{th}$ bit", according to the selected first code "!@#", the selected second code "Shift", the selected third code "XYZ", the selected fourth code "135", the first binary hash value bit number "24" and the second binary hash value bit number "24".

Furthermore, the first booting bit value set "1010" corresponds to the first kernel bit value set "0000", and the second booting bit value set "0110" corresponds to the second kernel bit value set "1111".

Thereafter, the booting program launches the irreversible hash function onto the first booting bit value set "1010" and the first kernel bit value set "0000". In a preferred embodiment, the irreversible hash function is an "MD5 operation". After the MD5 operation, a result obtained from the first booting bit value set "1010" and the first kernel bit value set "0000" is then converted into a binary result, assumed as "000000001010010100000000", which is a desired second binary hash value "000000001010010100000000".

The booting program launches the irreversible hash function onto the second booting bit value set "0110" and the second kernel bit value set "1111". In a preferred embodiment, the irreversible hash function is an "MD5 operation". After the MD5 operation, a result obtained from the second booting bit value set "0110" and the second kernel bit value set "1111" is then converted into a binary result, assumed as "101011110100101111110101", which is a desired second binary hash value "101011110100101111110101".

Thereafter, the booting program compares the first kernel bit positions "the 74$^{th}$ bit to the 97$^{th}$ bits" having the kernel bit values "111100001010010100001111" with the first binary hash value "000000001010010100000000" as being inconsistent. Namely, the kernel bit value "111100001010010100001111" of the first kernel bit positions "the 74$^{th}$ to the 97$^{th}$ bits" will not be deleted.

On the other hand, the booting program compares the second kernel bit positions "the 30$^{th}$ bit to the 53$^{th}$ bits" having the kernel bit values "101000001010010100000101" with the second binary hash value "101000001010010100000101" as being inconsistent. Namely, the kernel bit value 101011110100101111110101" of the second kernel bit positions "the 30$^{th}$ to the 53$^{th}$ bits" will not be deleted, thereby the original operating system kernel may not be restored and thus executed.

As such, a device having the booting program and the operating system kernel stored therein may be provided to be booted safely, the booting program is used to be computed together with the operating system kernel, avoiding a large amount of computation verification and thus a prolonged system booting time, one time of computation may authenticate mutually the booting program and the operating system kernel, there is no information swap between the booting program and the operating system kernel, the hash value may be avoided from being transmitted and thus stolen, and different devices may have different encryption ways although their operating systems are the same and thus the decryption information or ways of one such device may not be acquired by the operating system kernels on any of the other such devices.

In addition, when a re-encrypt operating system kernel encryption condition is triggered or one of the booting program and the operating system is updated, all the steps of the operating system decryption method are first performed and then an encryption process corresponding to the operating system kernel is performed, and which have been described and thus omitted herein for clarity. Among them, the re-encrypt operating system kernel condition includes a multiple times booting failure condition, a time condition, and a command condition. These are merely examples, without limiting the present invention. When a multiple times booting failure condition is triggered, a brute-force attack is determined as having occurred and an associated measure may be provided to avoid from being resolved owing to the brute force. The time condition may be the operating system kernel timely capable of being differently encrypted. The command condition may be the operating system kernel capable of being conducted with an amended encryption directly by a user. As such, the user may rapidly and conveniently perform the operating system kernel encryption and decryption without any discomfort with the process, and the re-encrypt operating system kernel encryption is facilitated to be conducted.

In view of the above, it may be known that the encryption and decryption methods of the present invention have the difference as compared to the prior art that the hash result is obtained from the computation between the booting program and the operating system kernel by using the definition table, the computation result is combined with the operating system kernel for encryption of the operating system kernel, and the operating system kernel may not be decrypted and thus booted whenever the booting program, the operating system kernel or the two combined are falsified or replaced.

By means of the above methods, the issue encountered in the prior art may be overcome, where the currently available booting program and operating system kernel have to be separately verified and the verification computation result has to be pre-stored into the OPT area and compared, requiring several times of verification and a huge amount of additional storage space, which are complex in the process, quite time consuming and unsafe.

The encryption and decryption methods of the present invention have the difference as compared to the prior art that the hash result is obtained from the computation between the booting program and the operating system kernel by using the definition table, the computation result is combined with the operating system kernel for encryption of the operating system kernel, and the operating system kernel may not be decrypted and thus booted whenever the booting program, the operating system kernel or the two combined are falsified or replaced.

By using the above technical means, the present invention may achieve the technical efficacy that the booting program and the operating system kernel may be authenticated bilaterally for safety booting.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An encryption method applied on an operating system kernel, being suitable for use on a device having a booting program and the operating system kernel stored therein, comprising steps of:
    pre-establishing a definition table in the booting program, the definition table having codes stored therein;
    selecting randomly a plurality of codes from the definition table by the booting program and recording the plurality of codes having been selected by the booting program when the booting program is executed at a first time;
    looking for at least one booting bit value set each having a plurality of booting bit values from the booting program in a storage space by the booting program according to the selected plurality of codes, and looking for at least one kernel bit value set each having a plurality of kernel bit value from the operating system kernel in the storage space by the booting program and a position of each of the plurality of kernel bit values in the kernel bit value set corresponding thereto, the booting bit value sets corresponding sequence to the kernel bit value sets;
    computing a reversible hash function to each of the booting bit value set and one of the kernel bit value set corresponding thereto by the booting program, to obtain a hash value corresponding thereto, respectively; and
    replacing each of the plurality of kernel bit values of the kernel bit value set at the position of each of the plurality of kernel bit values of the kernel bit value set with the hash value corresponding thereto by the booting program, respectively, and saving the kernel bit value set with the hash value replaced as the operating system kernel, to encrypt the operating system kernel, the encrypted operating system kernel being not executable.

2. The encryption method applied on the operating system kernel as claimed in claim 1, wherein each of the plurality of codes stored in the definition table has a meaning selected from a group consisting of a selected bit number, a designated bit, a frontward shift, a backward shift, and a shifted bit number.

3. The encryption method applied on the operating system kernel as claimed in claim 1, wherein the reversible hash function includes an XOR logic operation and a bitwise operation.

4. A decryption method applied on an operating system kernel, being suitable for use on a device having a booting program and the operating system kernel having been encrypted correspondingly, comprising steps of:
    extracting a plurality of codes having been recorded by the booting program;
    looking for at least one booting bit value sets each having a plurality of booting bit values from the booting program in a storage space by the booting program according to the selected plurality of codes, and looking for at least one kernel bit value sets each having a plurality of kernel bit values from the operating system kernel in the storage space by the booting program and a position of each of the plurality of kernel bit values corresponding thereto, the booting bit value sets corresponding to the kernel bit value sets;
    computing a reversible hash function to each of the booting bit value set and one of the kernel bit value set corresponding thereto by the booting program, to obtain a reversible-computed hash value corresponding thereto, respectively; and
    replacing each of the plurality of kernel bit values of the kernel bit value set at the position of each of the plurality of kernel bit values of the kernel bit value set with the reversible-computed hash value corresponding thereto by the booting program, respectively, and saving the kernel bit value set with the hash value replaced as the operating system kernel, to decrypt the operating system kernel, the decrypted operating system kernel being not executable.

5. The decryption method applied on the operating system kernel as claimed in claim 4, wherein the reversible-computed hash function includes an XOR logic operation and a bitwise operation.

6. The decryption method applied on the operating system kernel as claimed in claim 4, further comprising a step of first performing all the steps of the operating system decryption method and then performing an encryption process corresponding to the operating system kernel, when a re-encrypt operating system kernel encryption condition is triggered or one of the booting program and the operating system is updated.

7. The decryption method applied on the operating system kernel as claimed in claim 6, wherein the re-encrypt operating system kernel condition includes a multiple times booting failure condition, a time condition, and a command condition.

8. An encryption method applied on an operating system kernel, being suitable for use on a device having a booting program and the operating system kernel stored therein, comprising steps of:
    pre-establishing a definition table in the booting program, the definition table having codes stored therein;
    selecting randomly a plurality of codes from the definition table by the booting program and recording the plurality of codes having been selected by the booting program when the booting program is executed at a first time;
    looking for at least one booting bit value set each having a plurality of booting bit values from the booting program in a storage space by the booting program according to the selected plurality of codes, and looking for at least one kernel bit value set each having a plurality of kernel bit value from the operating system kernel in the storage space by the booting program and a position of each of the plurality of kernel bit values in the kernel bit value set corresponding thereto, the booting bit value sets corresponding sequence to the kernel bit value sets;
    computing a reversible hash function to each of the booting bit value set and one of the kernel bit value set corresponding thereto by the booting program, to obtain a binary hash value corresponding thereto, respectively; and
    replacing each of the plurality of kernel bit values of the kernel bit value set at the position of each of the plurality of kernel bit values of the kernel bit value set with the binary hash value corresponding thereto by the booting program, respectively, and saving the kernel bit value set with the hash value replaced as the operating system kernel, to encrypt the operating system kernel, the encrypted operating system kernel being not executable.

9. The encryption method applied on the operating system kernel as claimed in claim 8, wherein each of the plurality of codes stored in the definition table has a meaning selected from a group consisting of a selected bit number, a designated bit, a frontward shift, a backward shift, and a shifted bit number.

10. The encryption method on the operating system kernel as claimed in claim 8, wherein the irreversible hash function includes a secure hash algorithm (SHA) and a message-digest algorithm (MD).

11. A decryption method applied on an operating system kernel, being suitable for use on a device having a booting program and the operating system kernel having been encrypted correspondingly, comprising steps of:

extracting a plurality of codes having been recorded by the booting program and a bit number of a binary hash value having been recorded;

looking for at least one booting bit value set each having a plurality of booting bit values from the booting program in a storage space by the booting program according to the selected plurality of codes and the bit number of the binary hash value having been recorded, and looking for at least one kernel bit value sets each having a plurality of kernel bit values from the operating system kernel in a storage space by the booting program and a position of each of the plurality of kernel bit values corresponding thereto, the booting bit value sets corresponding to the kernel bit value sets;

computing a reversible hash function to each of the plurality of booting bit values of the booting bit value set and one of the plurality of kernel bit values of the kernel bit value set corresponding thereto by the booting program, to obtain the binary hash value corresponding thereto, respectively; and deleting the kernel bit value set when each of the plurality of kernel bit values of the kernel bit value set at the position of each of the plurality of kernel bit values is compared as being consistent with the binary hash value corresponding thereto, to decrypt the operating system kernel and execute the decrypted operating system kernel.

12. The encryption method applied on the operating system kernel as claimed in claim 11, wherein the irreversible hash function includes a secure hash algorithm (SHA) and a message-digest algorithm (MD).

13. The decryption method applied on the operating system kernel as claimed in claim 11, further comprising a step of first performing all the steps of the operating system decryption method and then performing an encryption process corresponding to the operating system kernel, when a re-encrypt operating system kernel encryption condition is triggered or one of the booting program and the operating system is updated.

14. The encryption method applied on the operating system kernel as claimed in claim 13, wherein the re-encrypt operating system kernel condition includes a multiple times booting failure condition, a time condition, and a command condition.

* * * * *